G. B. MAEGLY.
GEAR SHIFTING MECHANISM.
APPLICATION FILED JAN. 31, 1914.
1,233,088.
Patented July 10, 1917.
2 SHEETS—SHEET 2.
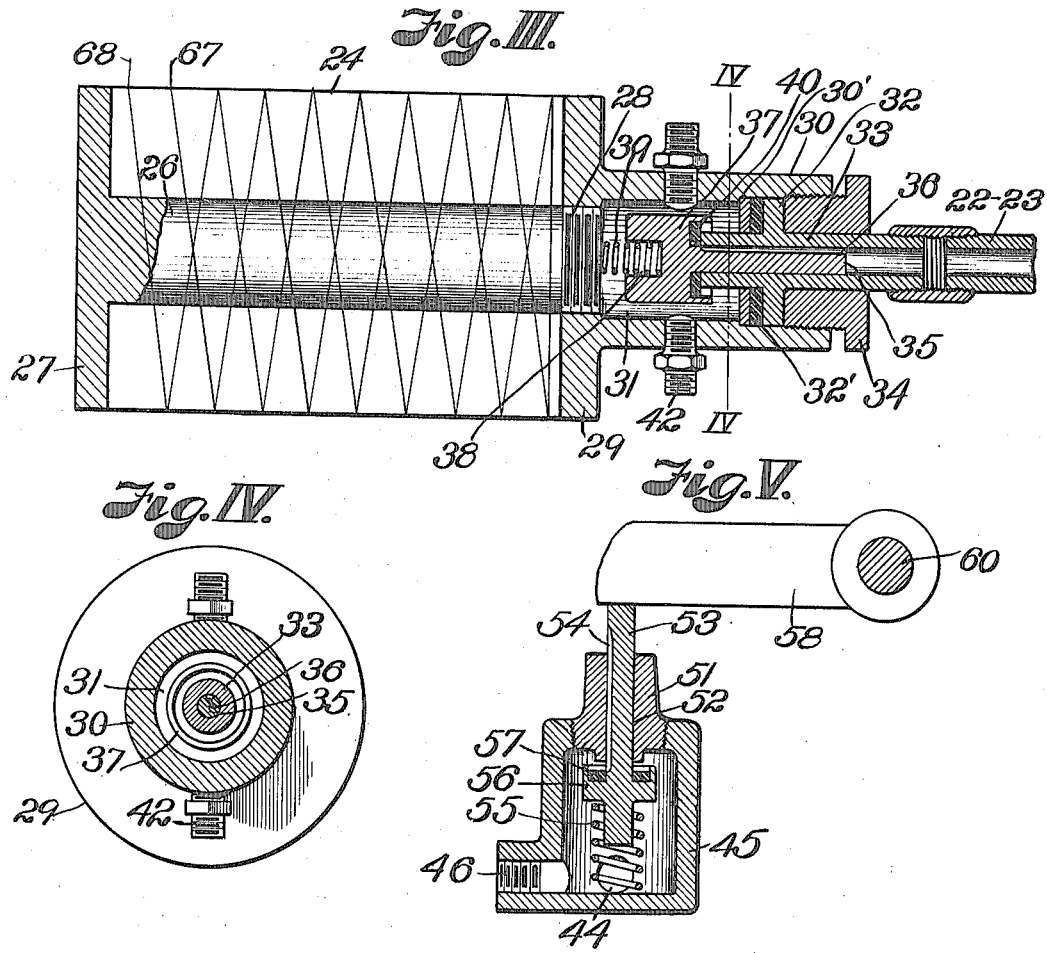
WITNESSES:
Arthur W. Capps.
Lynn A. Robinson.
INVENTOR
Geo. B. Maegly.
BY
Arthur C. Brown
ATTORNEY

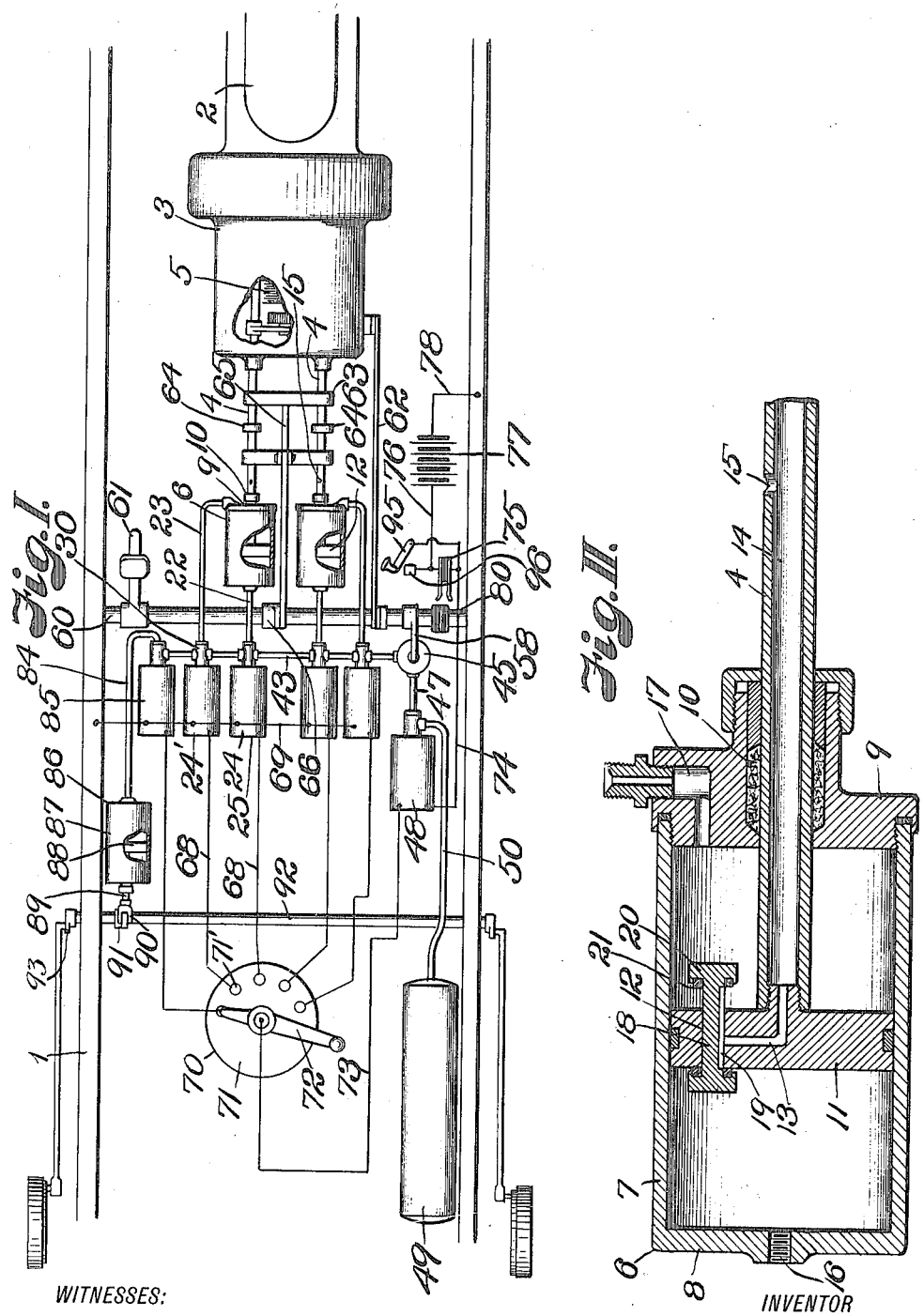

UNITED STATES PATENT OFFICE.

GEORGE B. MAEGLY, OF KANSAS CITY, MISSOURI.

GEAR-SHIFTING MECHANISM.

1,233,088.  Specification of Letters Patent.  Patented July 10, 1917.

Application filed January 31, 1914. Serial No. 815,732.

*To all whom it may concern:*

Be it known that I, GEORGE B. MAEGLY, a citizen of the United States, residing at Kansas City, in the county of Jackson and State of Missouri, have invented certain new and useful Improvements in Gear-Shifting Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in gear shifting mechanism for motor vehicles and consists in the combination and arrangements herein described and claimed.

The object of my invention is to provide simplified and positive means for controlling the power transmission and brake mechanisms by which the operator is relieved of the exacting and onerous duties ordinarily incident to the hand manipulation of these several elements.

In carrying out my invention I have provided improved details of structure; the preferred forms of which are illustrated in the accompanying drawings, wherein:—

Figure I is a plan view of a possible arrangement of my electro-pneumatic controlling mechanism, indicating its mounting on the chassis of a motor driven vehicle; the view being principally diagrammatic, and parts of the vehicle being merely indicated in order to indicate their combination with the control mechanism.

Fig. II is a longitudinal section of one of the pneumatic cylinders, and a portion of its gear shift rod.

Fig. III is a horizontal section of one of the electro-magnets for controlling the pneumatic cylinders.

Fig. IV is a transverse section on the line IV—IV, Fig. III, showing the armature slide-valve and conduit.

Fig. V is a vertical section of the valve for controlling flow from the air supply to the several magnetically controlled valves, and eventually to the gear shifting cylinders.

Fig. VI is a perspective view of the neutralizing device.

Referring more in detail to the parts:—

1 designates a portion of the chassis of a motor driven vehicle, 2 the motor, 3 the transmission case and 5 transmission and clutch mechanism, here illustrated as located within the transmission case, although such arrangement is not essential, as the parts heretofore mentioned have been illustrated in this form and combination merely for convenience and not as an indication that such arrangement is essential to my invention.

The shifting gear wheels of the transmission mechanism are connected with the rods 4 which project into the cylinders 6, each of which comprises a casing 7 having an integral head 8 at the end opposite that through which the shift rods are projected, and a head 9 having a central aperture, and stuffing box 10, within which the rods 4 are slidably mounted.

As the mechanism illustrated in the accompanying drawings is one comprising an ordinary three forward and one rear speed transmission mechanism, employing two separate shift rods, I have illustrated the two rods and a pneumatic cylinder and control mechanism for each of the shift rods, but as the mechanism for actuating and controlling each of the rods is identical, except as hereinafter specifically mentioned, I will describe but one, with the understanding that such description relates equally to both.

Each of the pneumatic cylinders 6 has a piston 11 therein, dividing its interior into separate chambers and provided with an aperture 12 whereby communication may be established between the chambers, or between either of the chambers and a channel 13 in the piston which communicates with a channel 14 in the shift rod 4, whereby air contained within either of the chambers may be exhausted through the channel in the piston into the shift rod and thence through an aperture 15 in said rod to atmosphere.

Slidably mounted in the aperture 12 in said piston is a valve 18, having a groove 19 extending longitudinally therethrough in constant communication with the piston channel 13, and having a head 20 at each end adapted for engagement with the cylinder head to move the valve in its seat and cause the packing 21 of the inner face of the head to engage the piston and seal the aperture 12, to cut off flow of air from said chamber to the piston and exhaust channels, so that when air is admitted to the chamber back of the valve head, the piston may be forced longitudinally within the cylinder to actuate the rod.

The cylinder 6 has a port 16 in one end and a port 17 in the head 9 at the opposite end, and extending from said ports are pipes 22—23 respectively, each of which leads to the valve chamber of one of the control magnets 24.

Each of the magnets 24 comprises a casing 25 and magnetic core 26 of soft iron, or the like, having a head 27 at one end and having screw threads 28 at its opposite end, whereby the core is attached to a non-magnetic head 29 which mates with the head 27 on the core to confine the winding of the magnet, and has a cylindrical extension 30 forming a valve chamber 31.

The extension 30 has a shoulder 30' on its inner surface, adjacent its outer end, and seated against said shoulder is the flange 32 of a conduit 33, which communicates with one of the pipes 22 or 23; the said flange being provided with packing 32' and held in place by a gland 34 to effectually seal the valve chamber.

Slidably mounted in the conduit 33 is a stem 35, having a longitudinal groove 36 therein and having an armature head 37 located within the valve chamber 31, the said armature head being provided with a retainer socket 38 for seating a spring 39 that bears against the end of the magnet core 26 to yieldingly urge the armature head outwardly away from the magnet core, and so that packing 40 contained within a socket 41, that surrounds the stem 35, will bear against the end of the conduit and seal the groove 36, to prevent the passage of air from the chamber 31 to the conduit 33 and thence to the pneumatic cylinders, but which is adapted to unseat when the magnet is energized and the armature head thrown toward the core to uncover the valve conduit, so that the pneumatic cylinders may be supplied with air.

The valves 24—24' are arranged in pairs, with the valves 24 adapted for controlling intake to one end of each of the cylinders and the valve 24' for controlling the intake to the opposite end of the cylinder, although the mechanical construction of the valves and magnets is the same.

In order to supply air to the valve chambers 31 I provide each of the extensions 30 with nipples 42 in opposite sides of the valve chamber, and mount pipe sections thereon, so that the valve chambers in the extensions of the several magnet casings are connected, and air may travel through the header pipe 43 and individual valve chamber to an active valve, in the manner hereinafter more fully described.

One of the end header sections 43 opens through a port 44 into a valve case 45, having a port 46, in communication, through the pipe 47, with a magnetically controlled valve 48, identical in construction and operation with the valves 24—24', except that the valve 48 has no connection with the header pipe 43, air being supplied to the valve from a supply source 49, through the pipe 50, and the valve 48 being adapted for controlling the supply to all of the auxiliary valves 24—24'.

The valve casing 45 contains a guide plug 51 having a central aperture 52, within which is slidably mounted a valve stem 53, having a longitudinal groove 54 forming a conduit through which air may pass from the valve chamber to atmosphere, when the valve stem is depressed against the tension of a spring 55 which seats on the bottom of the valve casing and engages a head 56 on the stem 53 to yieldingly urge the head toward the base of the plug 51; thus the packing 57 on said head will engage the base of the plug and effectually seal the valve chamber.

The stem 53 projects into the path of a lever 58 that is fixed on a clutch shaft 60, so that when the shaft is in its normal position the lever 58 will engage the valve stem and depress the same against the tension of its spring, so that should air be admitted to the valve casing from the primary valve, it will exhaust idly from the casing before it reaches any of the cylinder valves 24 or 24'.

The clutch shaft is provided with the usual pedal 61 and with a clutch lever 62 for actuating the transmission clutch in the ordinary manner; the parts being so arranged that when the clutch is thrown out the exhaust or by-pass valve 56 is closed to direct the flow of air from the primary control valve into the header leading to the shift control valves 24—24'.

As it is desirable that all the transmission gears be neutralized before making any particular shift, I have provided means for shifting the rods 4 to neutral position with each actuation of the clutch pedal prior to the actuation of any of the shift valves; the said mechanism comprising bars 63 which are slidably mounted on the shift rods 4 at opposite sides of collars 64 that are fixed on said rods.

Each of the bars 63 has links 65 connected with opposite ends respectively of a lever 66 that is fixed on the clutch shaft 60, so that when the clutch pedal is depressed, the bars 63 are moved in opposite directions and to a central position, so that the bars engage the collars 64 and slide the rods 4 to a neutral position, wherein all of the gears are moved to neutral position prior to the opening of any of the shift valves, and thereby insuring against the simultaneous engagement of a plurality of the gear wheels and the attendant damage to the transmission mechanism.

Referring now to the means for opening or closing the valves 24—24', 67—68 designate the terminals on each of the magnet windings, and 69 a common conductor for grounding the terminals 67 of all of the magnets on the frame 1. The terminal 68 of each of the magnets has a separate contact point on a controlling switch 70, that is located adjacent a driver's position, and comprises a disk 71, upon which the several contact points are mounted, and a manually operated selector 72 which is adapted for wiping the contact points 71' to select a circuit through the magnet of the individual valve, which is to be opened.

The selector 72 has a conductor 73 leading to the terminal 67 of the initial control valve 48, the terminal 68 of said valve has a conductor 74 leading to a knife switch 75 that is mounted adjacent the clutch shaft 60, and the said switch has a conductor 76 leading to a battery 77, having grounded connection with the frame 1 through the conductor 78.

The clutch shaft 60 is provided with a contact strip 80 which is insulated from the shaft and adapted for contacting both members of the knife switch to close a circuit therebetween, so that when the clutch shaft has been actuated by depression of the pedal 61, the lever will contact the knife switch, so that the selector having been moved to engagement with one of the contact points 71', a circuit is closed from the battery, through the knife switch 75, conductor 74, primary control valve magnet 48, conductor 73, selector 72, point 71', terminal 68, magnet 24, and a common conductor 69 to the frame, thereby energizing the magnet that controls the primary air valve, so that air is admitted from the supply source to the exhaust valve, from the exhaust valve through the header 43, to the active valve 24, and from said last named valve to the shift cylinder to operate the shift rod for the particular gear which it is desired to use, as will presently be more fully specifically pointed out.

The means for controlling the brake which I prefer to use, in connection with the speed gear mechanism, comprises a valve 85 which is identical with the initial control valve 48, and, therefore, substantially identical with the valves 24—24'; the terminals of the valve magnet being connected with the common conductor 69 and with the terminal point on the switch 70, as are the magnets for the valves 24—24'.

The conduit 84 leading from the valve 85 engages with a head 86 of a cylinder 87 that is identical in construction with the pneumatic control cylinders 6, and has a piston 88 therein provided with a rod 89 that extends through the opposite head of the cylinder and is connected by a yoke 90, with a lever 91, on the brake-shaft 92, having a lever 93 connected with any ordinary brake mechanism as indicated by the brake drum 93 and band 93' in the usual manner, so that when air is admitted to the cylinder through conduit 84 the piston is advanced, the brake-shaft rocked, and the brake applied.

In order that the brake may be operated independently of the other parts, and particularly without interfering with the transmission clutch, I have provided means for closing the electrical circuit otherwise than by the knife switch, so that the clutch shaft need be rotated only a sufficient distance to relieve the exhaust valve and without closing the knife switch.

The circuit closer for the brake-valve magnet comprises a foot switch 95 in circuit with the conductor 74 and a contact member 96 in circuit with the battery, so that by depressing the switch a circuit is closed from the battery to the conductor 74 and around the knife switch; in this way it is possible to close a circuit for the brake-valve magnet, independent of that through the knife switch.

Presuming the parts to be constructed and assembled as described, in a like operative combination, with the motor active and the gears in neutral position, when it is desired to start the vehicle, the clutch shaft is first rocked by depressing the pedal 61. The first action of the shaft when rocked is to move the neutralizing bars 63 toward each other; the action of the bars being idle in this instance, however, for the reason that the shift rods are already in neutral position.

Simultaneously with the movement of the shift bars the clutch bar 62 is advanced to throw out the clutch (not shown), the lever 58 is raised to release the valve stem 53, so that the latter may lift under the tension of its spring and shut off the exhaust from the valve casing, so that air when admitted to the casing is diverted into the header 43 and the contact strip 80 projected between the members of the knife switch to close a circuit from the battery through the selector switch and the magnet in a selected valve, if the selector arm has been moved over a contact point on the disk.

The movement of the clutch shaft does not, however, affect the transmission, for the reason that all of the valves controlling the intake to the pneumatic cylinders are held in closed position by the springs in the valve chambers 31 on the valves 24—24', 48 and 85, the movement of the clutch shaft and the bars actuated therefrom being merely preparatory to the shifting of the gears. As soon as the clutch shaft is actuated, however, the operator can turn the selector to the contact point on the switch, controlling a desired magnetic valve, for instance, the valve for throwing in the first forward speed gear—and the circuit is immediately closed from the battery through the knife switch, the magnet in the initial control valve 48, the selector arm, the contact point 71', the magnet for the valve 24 controlling admission of air to one end of the proper cylinders 6, through the common conductor 69 to the frame, and from the frame back to battery; thereby simultaneously energizing the magnet in valve 48 and the magnet in valve 28. When the magnet in valve 48 is energized, it draws its armature against the arm 27 and against the spring 39, so that the armature valve is unseated, and air from the supply allowed to pass through the chamber 31 and groove 36 into the pipe 47 and thence into the valve case 45 from whence it flows into the header 43.

The action of the magnet in valve 24 is identical with that just described, relative to valve 48, so that air passing through the header, and through the chambers of any intermediate or inactive valves, enters the chamber 31 of the valve 24 and passes out through the pipe 22 into the end of the cylinder 6, forcing the piston 11 through the cylinder and moving the rod 4 longitudinally to cause the gear wheel controlled by that rod to mesh with the proper member on the drive shaft of the engine.

As the piston 11 moves through its cylinder, air contained within the chamber in the cylinder opposite that receiving the air, is allowed to pass out through the valve 18 to the hollow rod 4 and exhaust to atmosphere, so that the piston is not retarded in its travel by air contained within the dead chamber. As the piston reaches its limit, the valve 18 is moved longitudinally by contact of the head 20 with the head of the cylinder, and air is exhausted through the slide rod.

As soon as the connection has been made, as described, the clutch shaft is released and returns to initial position, thereby breaking the circuit, and the valves 48 and 24 are closed and the exhaust valve 45 again opened to exhaust to atmosphere, so that when it is desired to change the speed of the car, it is necessary to again actuate the shaft through the foot pedal to reëstablish the circuit.

When it is desired to change from first to second speed the operator may first move the selector to a neutral point, and then actuate the clutch shaft to return the transmission gear mechanism to neutral position and again close the circuit through the knife switch, throw out the clutch and release the valve stem 53. The selector is then turned to the contact for the second speed and when the circuit is closed the magnet controlling the second speed clutch opens its valve and air is admitted to the cylinder 6, and moves the second speed gears into operative engagement, it being apparent that any speed change may be obtained in like manner by energizing the proper valve magnet through the selector.

To operate the brake, without interfering with the gear shift mechanism, the selector may be turned to the proper point for closing a circuit through the magnet in valve 85 and the auxiliary circuit closed by depressing the auxiliary switch and rocking the clutch shaft slightly or to sufficient extent to release the exhaust valve, but without interfering with the clutch bar or knife switch.

Having thus described my invention, what I claim as new therein, and desire to secure by Letters-Patent, is:—

1. The combination with brake mechanism of power-transmitting mechanism comprising a clutch and a plurality of sliding gears, of fluid means adapted for actuating said brake and for sliding said gears into operative engagement, a manually operable lever adapted for controlling said clutch and for neutralizing said gears, and electromagnetic means for controlling said fluid means.

2. The combination with a cylinder, of a valve for controlling flow to said cylinder, means for supplying air to the cylinder through said valve, initial control and exhaust valves interposed between the supply and said first named valve, common means for actuating the initial control and said first named valve, and separate means controlling the exhaust valve.

3. The combination with a cylinder, of a valve for controlling flow to said cylinder, an initial control valve for controlling flow to said first named valve, magnets for controlling said valves, a battery in circuit with both of said magnets, and a switch for controlling the battery circuit.

4. The combination with a plurality of cylinder chambers, of a valve for controlling flow to each of said chambers, a common supply for said valves, an initial control valve for controlling said supply, and electrical means for selectively operating the first named valves and for operating the initial control valve with either of the selective valves.

5. The combination with a plurality of cylinder chambers, of a valve for each of said chambers, an initial control valve, a supply conduit leading through the control valve to all of the chamber valves, and electrical means for actuating the control valve and either of the chamber valves.

6. The combination with a plurality of cylinder chambers, of a valve for each of said chambers, an initial control valve, a supply conduit leading through the control valve to all of the chamber valves, and electrical means for simultaneously actuating the control valve and either of the chamber valves.

7. The combination with a plurality of cylinder chambers, of a valve for controlling flow to either of said chambers, an initial control valve, a conduit leading through the control valve and having constant communication with all of the chamber valves, a magnet for each of said valves, a battery, a common conductor for the chamber magnets in circuit with the battery, a switch having independent connection with the chamber magnets and constant connection with the control magnet whereby a circuit is closed through the control magnet and either of the chamber magnets, for the purpose set forth.

8. The combination with a plurality of cylinder chambers, of a valve for controlling flow to either of said chambers, an initial control valve, a supply conduit leading through the initial control valve to all of the chamber valves, a separate electro-magnet for actuating each of said valves, a battery having a circuit line leading to one terminal of each of said magnets, a switch for controlling said circuit, a selector having separate contacts connected with the opposite terminals of said chamber magnets, and an arm connected with the opposite terminal of said control magnet whereby the circuit is closed through the control valve magnet and either of the chamber valve magnets.

9. The combination with a plurality of cylinder chambers, of a valve for controlling flow to either of said chambers, an initial control valve, a supply conduit leading through the initial control valve to all of the chamber valves, a separate electro-magnet for actuating each of said valves, a battery having a circuit line leading to one terminal of each of said magnets, a switch for controlling said circuit, a selector having separate contacts connected with the opposite terminals of said chamber magnets, an arm connected with the opposite terminal of said control magnet whereby the circuit is closed through the control valve magnet and either of the chamber valve magnets, and independent means for controlling said switch.

10. The combination with a plurality of cylinder chambers, of a valve for controlling flow to each of said chambers, an initial control valve, a conduit leading through the initial control valve and having constant communication with all of said chamber valves, an exhaust valve in said conduit between the control valve and chamber valves, means for yieldingly urging said exhaust valve to its seat, means for relieving the exhaust valve to close the conduit, and means for simultaneously actuating the control valve and either of said chamber valves.

11. The combination with a plurality of cylinder chambers, of a valve for controlling flow to each of said chambers, an initial control valve, a conduit leading through the control valve to each of the chamber valves, an exhaust valve in said conduit between the control valve and the chamber valves, means for yieldingly urging the exhaust valve to its seat, a battery, an electrical supply source in normally open circuit with all of said magnets, and means for simultaneously closing said circuit and releasing the exhaust valve.

12. The combination with a sliding gear transmission, of a fluid actuated gear shifting device, and electrically controlled means for supplying fluid to the gear shifting device.

13. The combination with a sliding gear transmission, of fluid actuated means for selectively sliding the gears into operative engagement, and manually operable means for neutralizing the said gears.

14. The combination with a shifting gear transmission, of fluid actuated means for shifting the transmission gears into operative engagement, electrically controlled means for supplying fluid to said shifting means, and manually operable means for neutralizing the said gears.

15. The combination with a shifting gear transmission and fluid actuated means for shifting the gears into operative engagement, electrically operated means for supplying fluid to said fluid actuated means, of a clutch, and manually operable means for simultaneously actuating the clutch and neutralizing the said gears.

16. The combination with a shifting gear transmission, of a fluid actuated gear shifting device adapted for shifting the gears into operative engagement, electrically controlled means for supplying fluid to said device, and automatic means adapted for exhausting fluid from the device after the gears have been moved into operative engagement.

17. The combination with a clutch and a shifting gear transmission, of fluid actuated means for shifting the gears into operative engagement, electrically controlled fluid supply means, and manually operable means adapted for simultaneously actuating the clutch and neutralizing the gears, and for actuating the supply means, after the gears are neutralized.

18. In a device of the character described, a cylinder, a piston within the cylinder, fluid actuated means for selectively moving the piston from a neutral point to either end of the cylinder, and manually operable means for moving the said piston from either end of the cylinder to a neutral point.

19. The combination with a cylinder, of an electrically controlled valve for controlling flow to the cylinder, a shift rod having a piston in said cylinder, a clutch shaft, and means operable by the clutch shaft for first shifting said rod and eventually closing a circuit through the valve control means.

20. The combination with a cylinder, of an electrically controlled valve for controlling flow to the cylinder, a shift rod having a piston in said cylinder, a clutch shaft, means operable by the clutch shaft for first shifting said rod and eventually closing a circuit through the valve control means, brake mechanism, electrically controlled means for actuating said mechanism, in circuit with said first named means, and means for closing said circuit independently of the means for controlling flow to said first named cylinder.

21. The combination with a cylinder, of electrically controlled means for controlling flow to said cylinder, a transmission mechanism comprising a shift rod having a piston in said cylinder, a clutch shaft, mechanism operable from the clutch shaft for shifting said rod, and means on the shaft for closing a circuit through the electrically controlled means.

22. The combination with a cylinder, of means for controlling flow to said cylinder, a transmission mechanism comprising a shift rod having a piston in said cylinder, a collar on said rod, a clutch shaft, and means operably connected with said shaft and slidable on said rod for engaging said collar to shift the rod, for the purpose set forth.

23. The combination with a cylinder, of means for controlling flow to said cylinder, a transmission mechanism comprising a tubular rod having a piston in said cylinder, said piston having a channel opening to opposite ends of the piston, a slide valve in said piston communicating with the piston channel, and means for controlling flow to opposite ends of the cylinder.

24. The combination with a cylinder, of a transmission mechanism comprising a tubular rod having an exhaust port, a piston on the rod within the cylinder, having a channel communicating with the rod channel and with opposite ends of the cylinder, a slide valve in the piston for controlling flow to the air channel, and means for controlling flow to opposite ends of the cylinder.

25. The combination with a transmission mechanism having a clutch and gear shift, the latter having a rod and a piston on said rod, of a cylinder for said piston, valve casings having conduits leading to opposite ends of the cylinder, a header for conducting air to and through the casings, valves in said casings, magnets for controlling said valves, a battery in circuit with all of said magnets, a control valve having a magnet in circuit with the battery, a brake cylinder fed from the header, a valve magnet in circuit with the cylinder valve magnets, and a controller for selectively closing a circuit through any of said magnets.

In testimony whereof I affix my signature in presence of two witnesses.

GEORGE B. MAEGLY.

Witnesses:
LYNN A. ROBINSON,
L. E. COATS.